Figure 1:
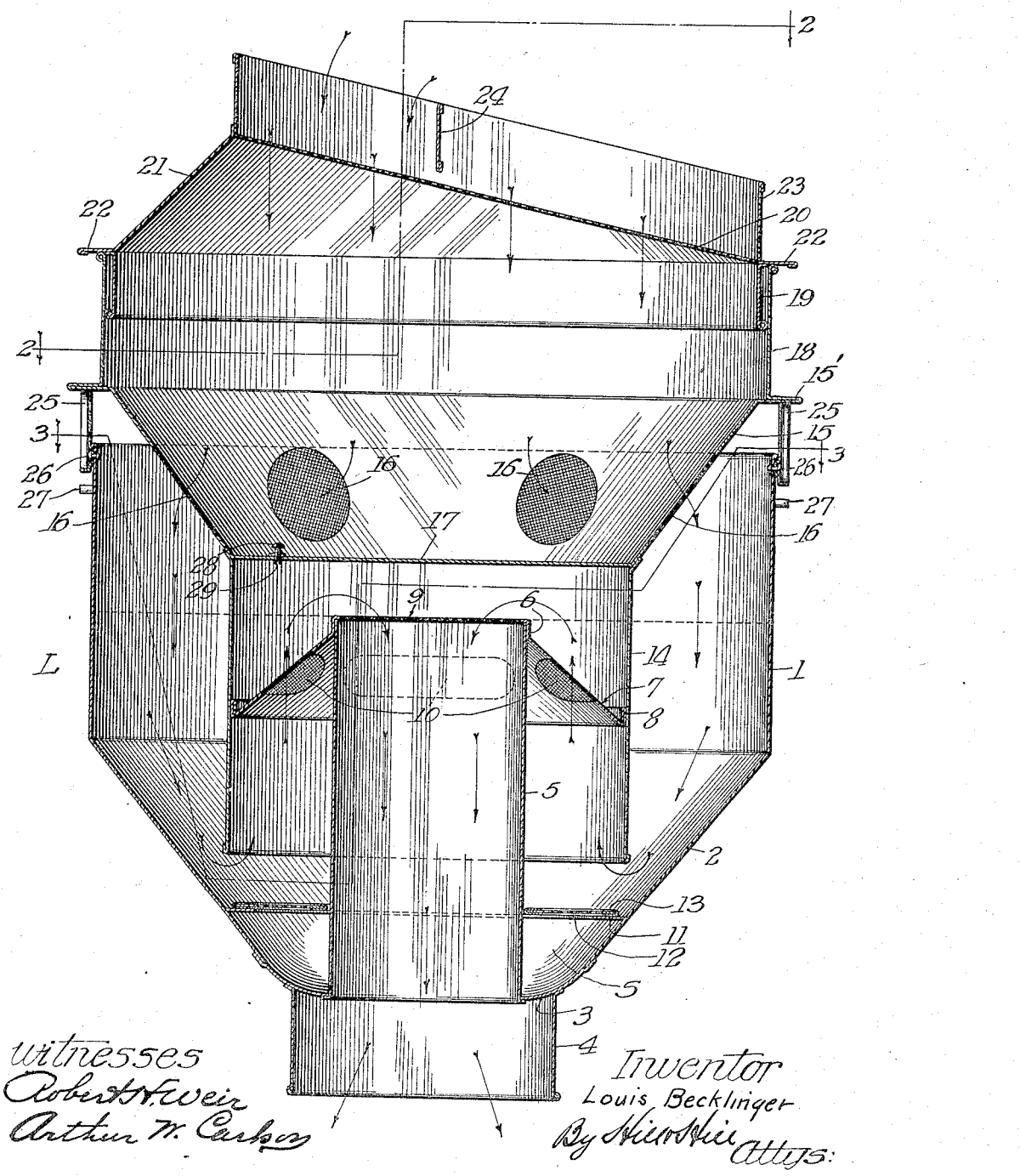

L. BECKLINGER.
STRAINER.
APPLICATION FILED NOV. 12, 1915.

1,203,093.

Patented Oct. 31, 1916.
2 SHEETS—SHEET 1.

Witnesses
Robert H. Weir
Arthur W. Carlson

Inventor
Louis Becklinger
By [signature]
Attys.

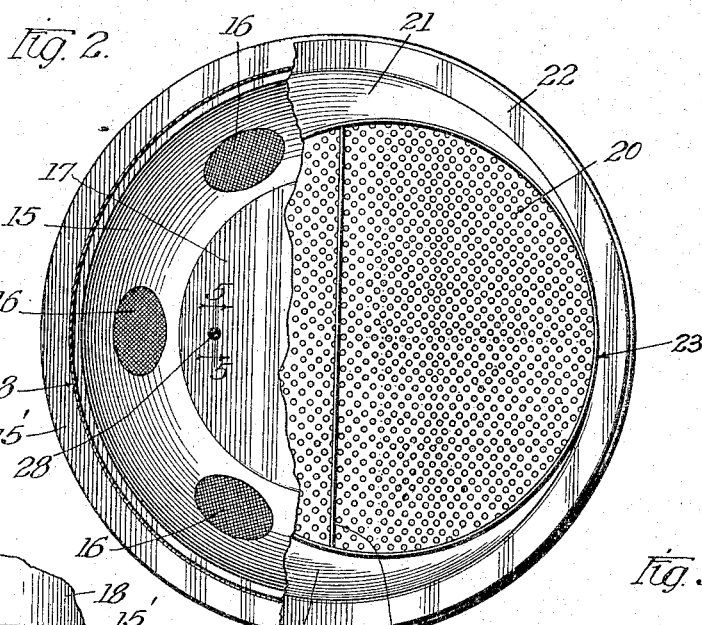

UNITED STATES PATENT OFFICE.

LOUIS BECKLINGER, OF MARENGO, ILLINOIS.

STRAINER.

1,203,093.  Specification of Letters Patent.  Patented Oct. 31, 1916.

Application filed November 12, 1915. Serial No. 61,109.

*To all whom it may concern:*

Be it known that I, LOUIS BECKLINGER, a citizen of the United States, residing at Marengo, in the county of McHenry and State of Illinois, have invented certain new and useful Improvements in Strainers, of which the following is a description.

My invention belongs to that general class of devices known as strainers, and relates particularly to a milk strainer for dairy purposes, where large quantities of milk are strained daily. Ordinarily the milk from the time it is taken from the cow until it is placed in the cans for delivery to the milk dealer, accumulates dust and various kinds of litter, such as hair, straw, and other impurities, which with an ordinary strainer is apt to pass through the strainer and into the can.

My invention has among its objects the production of a device of the kind described that is simple, convenient, durable, efficient and satisfactory, and that may be easily and perfectly cleaned and consequently kept in a sanitary condition.

The device is particularly adapted for dairy use and has as a further object a device that will permit the milk to settle for an interval during the straining process.

In addition it has among its objects the production of a device which may be carried from one can to another, even when containing milk, without leaving a trail of milk from one can to another.

Many other objects and advantages of the device will be obvious to those skilled in the art from the disclosure herein described.

To this end my invention consists in the novel construction, arrangement and combination of parts herein shown and described and more particularly pointed out in the claims.

In the drawings, wherein like reference characters indicate like or corresponding parts, Figure 1 is a sectional view taken centrally through the preferred form of the device; Fig. 2 is a sectional view taken substantially on line 2, 2 of Fig. 1; Fig. 3 is a sectional view taken substantially on line 3, 3 of Fig. 1; Fig. 4 is a side elevation of a portion of the device; Fig. 5 is a sectional view taken substantially on line 5, 5 of Fig. 2, and Fig. 6 is a sectional detail view taken through casing 1 in Fig. 4 to illustrate the pin 27.

Referring to the drawings, in which the preferred form of the device is shown, 1, 2 and 3 represent a suitable outer casing or shell of any suitable material, tin being found very satisfactory for the purpose. Extending from the bottom or under side of the shell is a discharge spout 4 of a size suitable for directing the milk into the milk can or other receptacle for receiving the strained milk. Extending upwardly and centrally the shell or casing is a tubular part 5, the arrangement of the parts being such that all milk discharged through the spout 4 must pass through the tubular part 5, entering the same from the upper end. The parts referred to consist substantially in a pan-shaped receptacle, having an internally and upwardly extending tubular part, the parts being constructed and proportioned to constitute a settling receptacle. Arranged on the upper end of tubular part 5, and secured thereto by a friction fit or threaded and screwed thereon, is a collar or top 6, which is flanged or extended outwardly, and preferably inclined downwardly, as shown at 7, the same being flanged at 8, if desired. The ring 6 carries a screen 9 of suitable size, mesh and material, and the flange 7 is provided with one or more openings, covered with screen 10 of the desired mesh. Arranged in the lower part of the shell, between the wall 2 and the tubular wall 5, is a screen 12, the same being shown provided with a frame 13 and normally supported by a flange 11 formed on the wall or bottom 2. The arrangement of the screen is such as to form a chamber S, or settling chamber, at the bottom of the device.

Arranged within the device is a tubular part 14 of a diameter to substantially closely fit the flange 8, so that all milk, or the liquid to be strained, must pass through the screens 10 to reach the interior of the tubular part 5. Part 14 is formed with a top 17 and with extending walls 15, which are preferably formed with a flange 15', thence extending upwardly as at 18, so that there is formed a receptacle having a depending tubular opening at the bottom. The walls 15 are provided with one or more openings covered with screen 16, or the equivalent, of the desired size, mesh or opening. Carried by part 18 is an upper or cover part consisting of the ring 19, which carries a screening plate 20. While I show a plate provided with a series of small apertures therethrough, a wire screen of suitable size mesh may, of course, be substituted therefor. The ring 19 is flanged as at 22, and is formed with a wall 21 supporting the plate 20, the plate being inclined, as most clearly shown in Fig. 1. I also provide an upwardly extending flange or rim 23 about the plate 20, and a cross partition or barrier 24, which, however, is slightly spaced or raised from the plate 20, for the reasons hereinafter mentioned.

When the device is in use, part 15 and its associated parts carried thereby are supported substantially as shown in Fig. 1, with the flange 15' above the top edge of the wall 1. Any suitable supporting means may be employed for supporting the flange 15' and its associated parts, a simple construction comprising the supporting members 25, of which there may be any number, which are pivotally secured at 26 to the shell 1. Where the members 25 are constructed as shown, I also prefer to provide stops 27 for supporting the members when they are out of operative position. When carrying the strainer from one receptacle to another the supporting members are dropped substantially as indicated in the dotted line in Fig. 4, so that the flange 15' rests upon the top edge of the wall 1. I also provide a vent opening and valve, or the equivalent, at some convenient place in the tubular wall 14 or top 17; as shown it is in the top 17. Ordinarily, the vent opening is closed by a screw 28, or any equivalent for the purpose. I have shown the screw slotted at 29 so that the same may be partially unscrewed and open the vent without entirely removing the screw.

In the operation of the strainer, assuming that it is assembled substantially as shown in Fig. 1, with the flange 15' and associated parts carried by the members 25, the milk is poured on the strainer plate 20, preferably at the upper or higher part thereof, the same passing through the holes or openings in the plate. Some may pass under the barrier 24 and the tendency for all particles of dirt or impurities too large to pass through the holes is to move down or to be washed to the lowest point on the screen and there remain. The milk itself tends to wash the impurities down there. After the milk passes through the plate 20 it falls into the receptacle made up of the walls 15, 17 and 18, and passes through the screened opening 16 into the lower receptacle, and thence rises between the walls 5 and 14, the weight of the incoming milk tending to raise the milk in the strainer through the screens 10, and thence it flows through the screen 9 and out through the spout into the receptacle. Some of the dirt or refuse which may have passed through the screen or plate 20 will be gathered on the bottom 17, while some will be deposited on the screen 12 and pass through into the settling chamber S. The same is again further screened or strained as it passes upwardly by the screens 10, and again screened or strained by the screen 9. No milk will be discharged through the spout 4 until the milk in the device has reached the level indicated by the dotted line indicated on Fig. 1. As each successive batch of milk is strained through the top plate 20 and passes through the strainer 16, its weight on the milk between the walls 1 and 14 forces that milk down and the milk between the walls 5 and 14 upwardly, straining the milk already standing in the strainer before the batch was poured in, and so with succeeding strainings. The milk standing in the strainer, however, between intermediate batches has had a slight interval to settle, all dirt, etc., settling down in the settling chamber S. This is particularly desirable, as the milk can be thoroughly strained only by allowing a certain time or interval for settling. At any time it is desired to carry the strainer from one receptacle to another the members 25 may be turned down. This permits the flange 15' to be carried by the top of wall 1, plate 17 rests on the top of screen 9, and the lower end of the wall 14 substantially closes the opening at the bottom of the wall. The whole device may then be picked up and carried from one receptacle to another without substantially the loss of a drop of milk. This is true whether or not there is milk in the device that has not yet passed through the screens 16, as the outlet is substantially sealed in the manner described. The purpose of the vent opening and valve 28 is to permit the escape of air, if desired, in manipulating the several parts.

After all the milk has been strained, or at such times as may be desired, the top part may be removed and the refuse taken off the plate 20. Part 18, with the parts 14, 15 and 17 carried thereby, may be easily removed, as may also be the ring 6 and the parts formed therewith. The screen 12 may also be removed. The entire device may be therefore easily disassembled and the same thoroughly cleaned and scalded to render the same sanitary. This is particularly important, as unless every part of the device may be reached for rinsing, wiping, brushing, scalding, or otherwise cleaning, the same constitutes a menace to the health of the users of the milk, and by allowing the intervals for settling, as previously described, the milk is strained and cleaned in a most efficient and satisfactory manner.

Having thus described my invention, it is obvious that various immaterial modifications may be made in the same without departing from the spirit of my invention; hence I do not wish to be understood as limiting myself to the exact construction, arrangement and combination of parts herein shown and described, or uses mentioned.

What I claim as new and desire to secure by Letters Patent is:—

1. In a straining device of the kind described and in combination, a series of coöperating casings having partitions disposed therein, and arranged to permit the milk to flow downwardly, thence laterally, and downwardly, and thence upwardly, and thence downwardly, with a settling chamber adjacent the partition deflecting the milk upwardly, and means for straining the milk during its progress through the strainer, said casings being adjustable relative one another, whereby the flow may be stopped as desired to prevent its discharge from the casing.

2. A device of the kind described comprising a casing arranged with a discharge spout at the bottom, a tubular part connected with and extending upwardly from said spout to the interior casing, a straining member arranged on the upper end of said tubular part and extending about the exterior thereof, a second pan-shaped straining casing having straining members in its sides, and provided with a depending tubular part of a size to extend adjacent the bottom of said casing between the wall of the first casing and the extending tubular part, and adjustable means carried by one of said parts for normally supporting said second mentioned straining casing, with the bottom thereof above and spaced from the upper end of said upwardly extending tubular part.

3. In a device of the kind described and in combination, a casing provided with a centrally extending tubular part, having a discharge opening at the bottom to the exterior of the casing, a strainer arranged at the top of said casing, a tubular shell closed at its upper end and arranged about said tubular part with a space therebetween at the sides and top, straining means arranged between said shell and said part, said shell having upwardly extending flanged side walls above the top, constituting a receptacle, and formed to overlie the top of the casing, means for supporting the same with the top above said detachable extending part, said parts so proportioned that the tubular shell may be dropped to close the top of the centrally extending tubular part, and substantially contact at its bottom with the casing, straining means arranged in the side walls, and a straining member arranged above and carried by said walls, consisting of an inclined member formed with apertures therethrough, and having a rim arranged thereabout.

4. In a device of the kind described and in combination, an inner straining member comprising side walls and a bottom, and provided with a tubular depending part on the bottom open at its lower end, said side walls provided with screened openings therethrough, an outer casing member arranged about said straining member, and provided with an upwardly projecting tubular part of a size to extend into said depending part, with a space between the walls, said tubular part open at its upper end and having a discharge opening at its lower end to the exterior of the casing, a strainer arranged at the upper end of said parts, straining means arranged between the walls of said parts, said strainer and straining means detachable, adjustable means for normally supporting said straining member on said casing member, with the upper end of the extending tubular part spaced from the bottom of the straining member, said outer casing provided with a spout extending about the discharge opening from said projecting tubular part, straining means carried by said straining member, consisting of an inclined straining member having a rim extended thereabout, and a partition extending across from one side of the rim to the other, with a space between the lower edge of the partition and said straining means.

In testimony whereof, I have hereunto signed my name in the presence of two subscribing witnesses.

LOUIS BECKLINGER.

Witnesses:
ALBERT S. HORTON,
CLARENCE COARSON.